United States Patent

[11] 3,564,340

[72] Inventor Peter F. Bahr
 Union City, N.J.
[21] Appl. No. 813,000
[22] Filed Apr. 3, 1969
[45] Patented Feb. 16, 1971
[73] Assignee By mesne assignments, to Varian Associates
 Palo Alto, Calif.

[54] MANUALLY TUNED CROSSED-FIELD TUBE EMPLOYING A FRICTIONALLY LOADED BALL SCREW TUNING ACTUATOR
 7 Claims, 1 Drawing Fig.
[52] U.S. Cl. .................................................... 315/39.61,
 315/1.77, 74/99
[51] Int. Cl. ................................................. H01j 25/50
[50] Field of Search ........................................... 315/39.53,
 39.61, 39.77

[56] References Cited
 UNITED STATES PATENTS
| | | | |
|---|---|---|---|
| 2,512,901 | 6/1950 | Litton........................... | 315/39.61 |
| 2,852,719 | 9/1958 | Craduchettes ............... | 315/39.61 |
| 3,157,818 | 11/1964 | Olson, Jr. et al.............. | 315/39.77 |

Primary Examiner—Herman Karl Saalbach
Assistant Examiner—Saxfield Chatmon, Jr.
Attorneys—Stanley Z. Cole and Robert W. Dilts ABSTRACT: A crossed-field microwave tube is disclosed. The tube is of the magnetron type, having a circular electric mode resonator coaxially disposed of a microwave anode circuit with the fields of the anode circuit being coupled to the fields of the resonator. A tuning structure is disposed in the coaxial resonator for tuning the operating frequency of the tube. The tuning actuating structure includes a metallic bellows, sealing a movable tuning structure to the remaining portion of the vacuum envelope of the tube. A ball screw structure is disposed externally of the envelope and is coupled to the tuning structure for moving the tuning structure through the bellows. A thrust bearing is disposed between a rotatable portion of the ball screw structure and a fixed position of the envelope, such bearing member being pressed into engagement by atmospheric pressure exerted on the bellows and which pressure is transmitted as a loading force on the thrust bearing member. The thrust bearing member is selected of a material, such as Teflon, to provide a certain predetermined friction torque loading on the ball screw to prevent inadvertent rotation of the ball screw, while permitting the tuner to be actuated with less than 50 inch ounces of torque manually applied to the rotatable member of the ball screw. A second friction loading thrust bearing member, as of Teflon, is provided to frictionally load the ball screw by vibration forces to prevent inadvertent rotation by vibration of the tube.

PATENTED FEB 16 1971 3,564,340
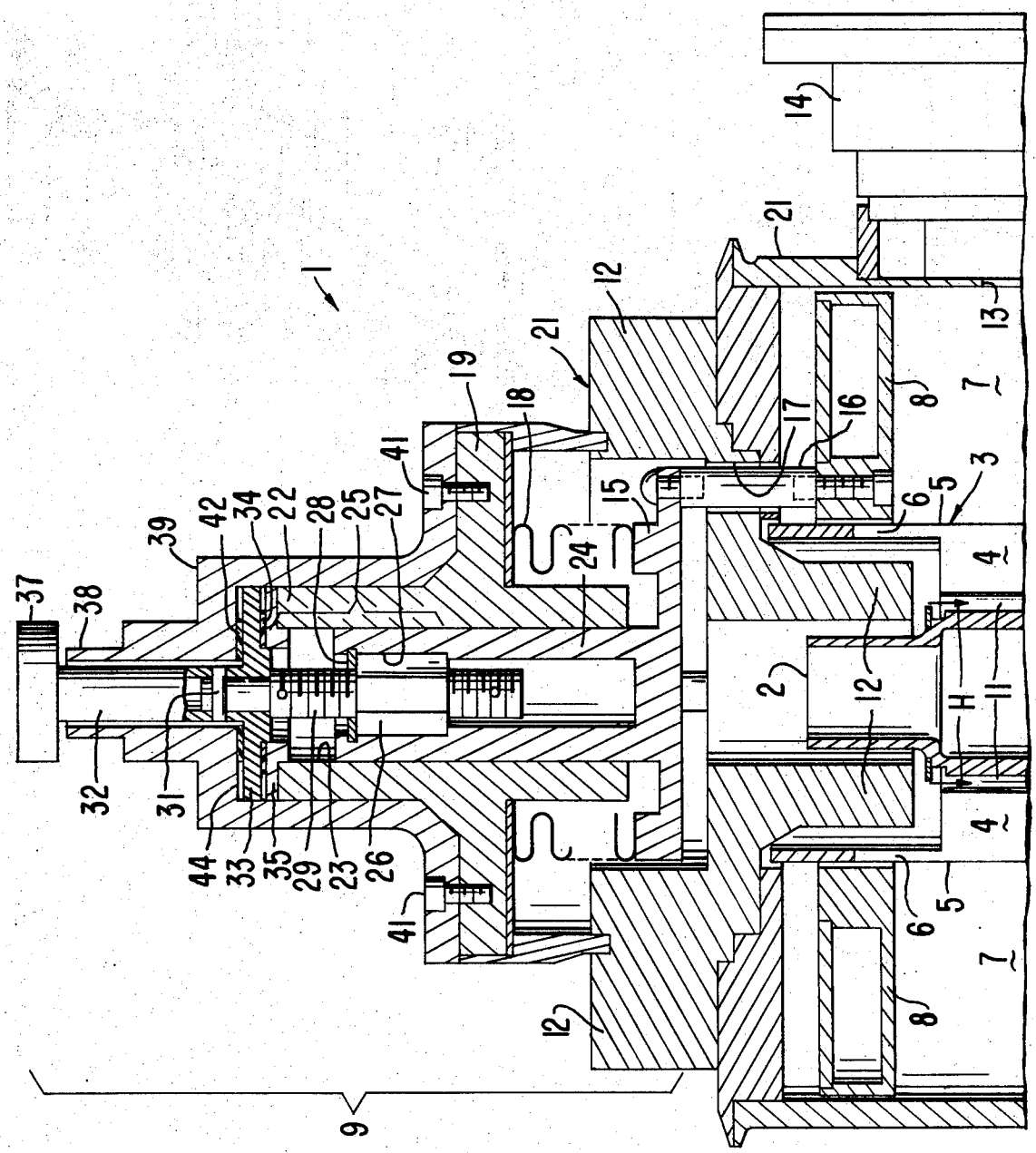
INVENTOR.
PETER F. BAHR
BY
Robert W. Wilts
ATTORNEY

MANUALLY TUNED CROSSED-FIELD TUBE EMPLOYING A FRICTIONALLY LOADED BALL SCREW TUNING ACTUATOR

DESCRIPTION OF THE PRIOR ART

Heretofore, coaxial magnetron tubes have been tuned by means of external ball screw tuner actuator structures for effecting movement of the tuner within the coaxial cavity resonator via the intermediary of a flexible bellows, sealing the tuning actuating structure to the vacuum envelope of the tube. Such actuators have included a motor and clutch arrangement for rotating the rotatable member of the ball screw to produce translation of tuning member within the cavity. Such ball screw tuning actuator devices are extremely efficient, from a frictional point of view, and inadvertent movement of the tuner structure due to atmospheric pressure transmitted via the bellows to the ball screw was prevented, in use, by the provision of the motor-driven clutch which prevented motoring of the ball screw. When the clutch was disengaged the frictional loading on the ball screw assembly was insufficient to prevent the tuner from motoring to its innermost position within the cavity. Thus, when the clutch was disengaged the tube would automatically be tuned to one extreme of the tunable band of the tube due to the motoring effect of the ball screw tuner actuator.

Manually tuned tubes have not, heretofore, utilized a ball screw tuner actuator. Such manually tuned tubes have utilized more conventional screw actuators. However, when such screw actuators are applied to tubes having relatively large diameter bellows, as of one square inch area or larger, the frictional torque loading on the tuner actuator exceeds 50-inch ounces which is considered to be excessive for manual tuning.

SUMMARY OF THE PRESENT INVENTION

The principal object of the present invention is the provision of an improved tuning actuator structure for manually tuned crossed-field tubes.

One feature of the present invention is the provision, in a manually tuned crossed-field tube, of a ball screw tuner actuator with a frictional thrust bearing provided between the rotatable portion of the ball screw and the envelope of the tube for frictionally loading the ball screw structure to prevent inadvertent rotation while allowing the ball screw to be manually rotated with less than 50-inch ounces of torque manually applied to the rotatable member of the ball screw structure.

Another feature of the present invention is the same as the preceding feature, wherein the thrust bearing member has a coefficient of friction falling within the range of 0.03 to 0.1.

Another feature of the present invention is the same as any one or more of the preceding features wherein the thrust bearing member is a relatively thin annular washer of polytetrafluoroethylene resin.

Another feature of the present invention is the same as any one or more of the preceding features including a second thrust bearing member disposed opposite the first thrust bearing member to be pressed into slidable engagement with a bearing surface by vibrationally produced forces of inertia for frictionally loading the ball screw structure to prevent inadvertent rotation of the ball screw by vibration of the tube.

Other features and advantages of the present invention will become apparent upon a perusal of the following specification taken in connection with the accompanying drawings wherein:

BRIEF DESCRIPTION OF THE DRAWINGS

The drawing is a longitudinal sectional view of a portion of a magnetron oscillator incorporating features of the present invention.

DESCRIPTION OF PREFERRED EMBODIMENTS

Referring now to the drawing, there is shown a longitudinal sectional view of a portion of a magnetron 1 incorporating features of the present invention. The magnetron 1 is of the coaxial type, having a hollow cylindrical cathode emitter 2 surrounded by an anode circuit 3. The anode circuit 3 comprises an array of vane resonators 4 carried at their roots from a hollow cylindrical anode wall 5. The anode wall 5 includes an array of longitudinally directed slots 6 communicating through the wall 5 with alternate vane resonators formed by the spaces between adjacent vanes 4. A coaxial cavity resonator 7 dimensioned for operation on a circular electric mode such as the $TE_{0,1,1}$ mode, surrounds the system of vane resonators 4 and is electromagnetically coupled thereto via the longitudinally directed coupling slots 6. An annular conductive tuning ring 8 is disposed within the cavity 7 and defines one end wall thereof.

A tuner actuator structure 9 is coupled to the tuning ring 8 for moving the tuning ring 8 axially of the cavity 7 for tuning the frequency thereof. The circular electric mode of the cavity 7 locks the frequency of the $\pi$ mode of the excited vane resonators 4 to the resonant frequency of the cavity 7. An annular crossed-field interaction region 11 is defined by the annular space between the cathode electrode 2 and the surrounding array of vane resonators 4.

A cylindrical magnetic pole piece structure 12 is disposed at one axial end of the crossed-field interaction region 11 and cooperates with a similar hollow cylindrical pole piece structure, not shown, disposed at the opposite end of the crossed-field interaction region 11 for producing an axially directed magnetic field H in the interaction region 11. Under the influence of the axially directed magnetic field and a radially directed electric field between anode 3 and cathode 2, an electron stream is generated in the interaction region which interacts with the electric fields of the $\pi$ mode of the vane resonator system to produce output microwave energy which is coupled from the excited circular electric mode cavity 7 via an output coupling iris 13 and output waveguide 14 to a load, not shown. The output waveguide section 14 includes a wave permeable gas type window structure, not shown, which permits the output microwave energy to be transmitted through the wave guide 14 while maintaining a vacuum within the tube 1. The frequency of the microwave output is tuned by axial movement of the tuner 8.

The tuner actuator 9 includes a disc shaped spider plate 15 which is affixed to the tuner ring 8 via four axially directed spider legs 16 disposed at 90° intervals about the periphery of the spider plate 15. The spider legs 16 extend axially of the tube through holes 17 in the pole piece 12. A flexible bellows 18, as of stainless steel, is sealed at one end to the spider plate 15 and sealed at the other end to a cover plate 19 forming a portion of a vacuum envelope 21 of the tube 1. The vacuum envelope 21 envelopes the anode, cathode, and cavity 7.

Cover plate 19 includes a centrally disposed axially directed sleeve portion 22 with the inside surface of the sleeve 22 defining a fixed tuner bearing surface 23. A hollow cylindrical axially directed central portion 24 of the spider plate 15 forms a movable tuner bearing for slidable engagement with the fixed tuner bearing surface 23.

A ball screw assembly 25 is coaxially disposed of the central extension 24 of the spider plate 15. The ball screw nut portion 26 of the ball screw assembly 25 is carried within a recessed portion 27 of the central extension 24 of the spider 15. The ball screw nut 26 is retained within the central extension 24 via a retaining ring 28 and is captured against rotation via the friction between the nut 26 and the retaining ring 28. The ball screw portion 29 of the ball screw assembly 25 is pinned via pin 31 to a spline 32. The spline 32 includes a radially directed flange portion 33 which is rotatable with the ball screw 29.

A polytetrafluoroethylene (Teflon) washer 34, 0.015 inches thick with an ID and OD of 0.6 inch 1.0 inch respectively, forms a thrust bearing disposed between the flange 33 and an inwardly directed flange portion 35 at the outer end of the central extension 22 of the cover plate 19. Atmospheric pressure exerted on the bellows 18 is transmitted via spider plate 15, central extension 24, and the ball screw assembly 25 to the radial flange 33 of the spline 32. In a typical example, the bellows 18 has an area of approximately 4 square inches such that approximately 55 pounds of thrust is exerted against thrust bearing 34.

Thrust bearing 34 is selected to have a coefficient of friction between 0.03 and 0.1 to provide more than 7-inch ounces of frictional torque to the ball screw portion 29 to prevent the ball screw 29 from motoring (inadvertently turning due to the downwardly directed force on the ball screw produced by atmospheric loading on the ball nut 26). When the outer diameter of the Teflon thrust washer 34 is approximately one inch and bears against stainless steel flange members 33 and 35, the thrust bearing 34 presents approximately 35-inch ounces of frictional loading to the ball screw 29. This is sufficient to prevent motoring of the ball screw assembly while permitting the ball screw 29 to be rotated manually via a suitable knob 37 coupled to the spline 32 via mating splines formed in the knob 37.

Under these conditions, the knob 37 is easily turned with less than 50-inch ounces of torque exerted manually on the knob 37. Although a simple knob 37 has been shown for manually turning the ball screw 29, the knob 37 is typically located at a remote front panel and is connected to the spline 32 by a shielded cable having a spline on one end which mates with the spline 32. In such a case the outer shield for the shielded cable is fitted with a nut which threadably mates with external threads 38 provided on the outer end of a cylindrical cover member 39 which covers the tuner actuating mechanism and which is fixedly secured to the envelope 21 via screws 41.

In some cases, where the tube 1 is subjected to severe vibrational environment, the vibrational forces exerted on the tuner actuator structure 9 can overcome the positive atmospheric loading on the thrust bearing 34 such that it is possible for the ball screw 25 to motor. In order to prevent this from happening in severe vibrational environments, a second thrust bearing member 42, as of 0.015 inch thick polytetrafluoroethylene resin, is positioned between the outer surface of the flange 33 and in inner bearing surface 44 of the cover 39. The cover 39 is tightened down sufficiently with respect to the thrust bearing 42 and flange 33 such that forces which would tend to pull the flange 33 out of bearing engagement with the first thrust bearing 34 would press the second thrust bearing 42 into slidable engagement between the bearing surface 44 and the upper bearing surface of the flange 33, thus frictionally loading the spline 32 and ball screw assembly 25 to prevent motoring thereof.

Although the tuner actuator 9 has been described with the nut member 26 fixedly secured to the spider plate 15, the ball screw assembly 25 may be arranged such that the ball screw 29 is fixedly secured and captured against rotation to the central extension 24 of the spider plate 15 while the ball screw nut 26 forms the rotatable member and either includes an outwardly directed flange portion similar to flange 33 or includes bearing surfaces at opposite ends of the nut for cooperative engagement with the thrust bearing members 34 and 42 provided between the nut 26 and the vacuum envelope 21 and housing 39, respectively.

The tuner actuator structure 9 has been described as employed for tuning a coaxial magnetron of the type wherein the circular electric mode cavity 7 surrounds the cathode electrode 2. This is not a requirement and the tuner actuator mechanism is equally applicable to other types of coaxial magnetrons. More particularly, it is especially suitable for use with coaxial magnetrons of the type wherein the circular electric mode cavity is centrally disposed of the tube and surrounded by a vane array which in turn is surrounded by a cathode electrode. Such latter tubes are disclosed in U.S. Pat. No. 3,290,548, issue of Dec. 6, 1966, and assigned to the same assignee as the present inventor.

Typical ball screw assemblies 25 which may be employed in the present invention are commercially available from Beaver Precision Products, Inc., of 1970 Big Beaver Road, Troy, Michigan, as Model No. M-505.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

I claim:

1. In a crossed-field microwave tube, means forming a cathode electrode, and anode electrode having a microwave circuit structure forming a portion thereof concentrically disposed of said cathode electrode to define an annular crossed-field interaction region in the space between said anode and cathode, whereby microwave energy on said circuit interacts with electrons in the interaction region to produce output microwave energy, tuner means movable within a frequency determinative region of the tube for tuning the frequency of the microwave output energy, means defining an evacuated envelope structure enveloping said anode and a cathode, said envelope structure including a flexible wall portion sealing said movable tuning means to the remaining portion of said envelope, a ball screw structure coupled to said tuning means externally of said envelope for effecting movement of said tuning means through said flexible wall portion, said ball screw structure including a ball screw member and a nut member one of which members is restrained against rotation while the other member is manually rotatable to effect movement of said tuning means, THE IMPROVEMENT COMPRISING, a friction loading thrust bearing member disposed between an annular bearing portion of said rotatable member of said ball screw structure and a bearing portion fixed to said envelope, said thrust bearing member providing substantially sliding friction to produce a certain predetermined frictional torque in opposition to rotation of said rotatable member, such thrust bearing member being thrust into slidable engagement with one of said bearing portions by atmospheric pressure exerted on said flexible wall portion and transmitted to said ball screw structure for frictionally loading said ball screw structure with said certain predetermined frictional torque to prevent inadvertent rotation thereof while allowing the ball screw to be manually rotated with less than 50-inch ounces of torque manually applied to said rotatable member of said ball screw structure.

2. The apparatus of claim 1 wherein said frictional loading thrust bearing member has a coefficient of friction falling within the range of 0.03 to 0.1.

3. The apparatus of claim 1 wherein said thrust bearing member is a relatively thin annular washer of polytetrafluoroethylene resin.

4. The apparatus of claim 3 wherein said nut member of said ball screw is affixed to said movable turning structure for translation therewith and is restrained against rotation, and said screw member of said ball screw structure is manually rotatable to effect tuning of said cavity.

5. The apparatus of claim 2 including means forming a second friction loading thrust bearing member disposed between a second annular portion of said rotatable member of said ball screw structure and a second bearing surface portion fixed to said envelope structure, such second thrust bearing being pressed into slidable engagement with one of said second bearing surfaces by vibrationally produced forces of inertia for frictionally loading said ball screw structure with a certain predetermined frictional torque to prevent inadvertent rotation of said ball screw structure by vibration of the tube.

6. The apparatus of claim 5 wherein said second frictional loading thrust bearing member has a coefficient of friction falling within the range of 0.03 to 0.1.

7. The apparatus of claim 5 wherein said second thrust bearing member is a relatively thin annular washer of polytetrafluoroethylene resin.